(12) United States Patent
Imamura et al.

(10) Patent No.: US 11,137,750 B2
(45) Date of Patent: Oct. 5, 2021

(54) TIME-SERIES DATA PROCESSING DEVICE

(71) Applicant: MITSUBISHI ELECTRIC CORPORATION, Tokyo (JP)

(72) Inventors: Makoto Imamura, Tokyo (JP); Takaaki Nakamura, Tokyo (JP); Norio Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 343 days.

(21) Appl. No.: 16/323,405

(22) PCT Filed: Oct. 6, 2016

(86) PCT No.: PCT/JP2016/079796
§ 371 (c)(1),
(2) Date: Feb. 5, 2019

(87) PCT Pub. No.: WO2018/066108
PCT Pub. Date: Apr. 12, 2018

(65) Prior Publication Data
US 2019/0179296 A1    Jun. 13, 2019

(51) Int. Cl.
G05B 23/02 (2006.01)
G05B 19/418 (2006.01)
G05B 9/02 (2006.01)

(52) U.S. Cl.
CPC .......... G05B 23/0221 (2013.01); G05B 9/02 (2013.01); G05B 19/418 (2013.01); G05B 23/02 (2013.01); G05B 23/0264 (2013.01); Y02P 90/02 (2015.11)

(58) Field of Classification Search
CPC ............... G05B 23/0221; G05B 23/02; G05B 23/0264; G05B 9/02; G05B 19/418
See application file for complete search history.

(56) References Cited

U.S. PATENT DOCUMENTS

| | | | |
|---|---|---|---|
| 6,374,159 B1 * | 4/2002 | Naruse | G01B 21/26 33/203.15 |
| 2007/0136015 A1 | 6/2007 | Suzuki et al. | |

(Continued)

FOREIGN PATENT DOCUMENTS

| | | |
|---|---|---|
| JP | 8-260309 A | 10/1996 |
| JP | 2004-318273 A | 11/2004 |

(Continued)

OTHER PUBLICATIONS

Extended European Search Report dated Aug. 12, 2019 in corresponding European Patent Application No. 16918304.3.

(Continued)

*Primary Examiner* — Bryan Bui
(74) *Attorney, Agent, or Firm* — Birch, Stewart, Kolasch & Birch, LLP

(57) ABSTRACT

A time-series data processing device (10) includes: a protruding data extracting unit (2) for extracting, from time-series data (1) which is a sequence of values obtained from sequential observation with the elapse of time, protruding data including an ascending leg a value of which continuously rises with respect to time and a descending leg a value of which continuously drops with respect to time; an occurrence pattern defining unit (3) for defining an occurrence pattern of protruding data in the time-series data (1); and an occurrence pattern detecting unit (4) for detecting, as a segment (5), one or more pieces of protruding data matching the occurrence pattern defined by the occurrence pattern defining unit (3), from among a set of pieces of protruding data extracted by the protruding data extracting unit (2).

5 Claims, 11 Drawing Sheets

(56) References Cited

U.S. PATENT DOCUMENTS

2011/0320388 A1 12/2011 Wong et al.
2017/0139400 A1* 5/2017 Imamura ............ G05B 23/0221

FOREIGN PATENT DOCUMENTS

| | | |
|---|---|---|
| JP | 2007-148890 A | 6/2007 |
| JP | 2011-34389 A | 2/2011 |
| TW | M449315 U1 | 3/2013 |
| WO | WO 2015/173860 A1 | 11/2015 |

OTHER PUBLICATIONS

Office Action dated Jul. 11, 2019 in corresponding Korean Patent Application No. 2019-7009138 with an English Translation.
Office Action dated Nov. 4, 2020 issued in the corresponding Indian Patent Application No. 201947011033.
International Search Report, issued in PCT/JP2016/079796, PCT/ISA/210, dated Nov. 8, 2016.
Makoto Imamura et al., "Leg Vibration Analysis for Time Series", Information Processing Society of Japan, (Apr. 2016), vol. 57, No. 4, pp. 1303-1318.
Office Action issued in Japanese Patent Application No. 2017-501425 dated Apr. 25, 2017.
Office Action issued in Taiwanese Patent Application No. 105139421 dated Nov. 6, 2017.
Office Action issued in Chinese Patent Application No. 201680089722.6 with English translation, dated May 19, 2021.

* cited by examiner

Time-Series Data
x(1), x(2), ..., x(n)

Subsequence x(i), x(i+1), ..., x(j)

Where i = 10, and j = 18.

Amplitude = A
Number of Vibrations = 2

Amplitude = A
Number of Vibrations = -2

TIME-SERIES DATA PROCESSING DEVICE

TECHNICAL FIELD

The present invention relates to a time-series data processing device for processing time-series data.

BACKGROUND ART

In power generation plants such as thermal power generation, hydraulic power generation, or nuclear power generation, chemical plants, iron and steel plants, water and sewerage plants, etc., control systems for controlling plant processes are introduced. Also in facilities such as buildings or factories, control systems for controlling, for example, air conditioning, electricity, lighting, or water supply and drainage are introduced. In these control systems, various types of time-series data observed with the elapse of time by sensors attached to devices are accumulated.

Likewise, in an information system related to, for example, the economy or management, time-series data in which values of stock prices, sales, or the like are recorded with the elapse of time is accumulated.

Conventionally, abnormalities and others in plants, equipment, management status, etc. are detected by analyzing changes in values of such time-series data. In particular, an abnormality or the like is detected by obtaining the degree of vertical fluctuations of values of time-series data.

For example, a data analysis device according to Patent Literature 1 is configured to extract time-series data of an event section from time-series data of the entire process for manufacturing a certain product and to detect an abnormality or the like in the event section.

CITATION LIST

Patent Literature

Patent Literature 1: JP 2004-318273 A

SUMMARY OF INVENTION

Technical Problem

However, the data analysis device according to Patent Literature 1 extracts time-series data for each of events subdivided from a production process, and thus it is required to acquire and use event information indicating occurrence timings of the events from a production line. Therefore, there is a problem that the data analysis device cannot extract time-series data of event sections in the case where there is no event information thereof.

The present invention has been devised to solve the problem as described above, and it is an object of the present invention to enable extraction of time-series data of an event section even in the case where there is no event information indicating an occurrence timing of the event.

Solution to Problem

A time-series data processing device according to the present invention includes: a processor to execute a program; and a memory to store the program which, when executed by the processor, performs processes of, extracting, from time-series data which is a sequence of values obtained from sequential observation with elapse of time, protruding data including an ascending leg a value of which continuously rises with respect to time and a descending leg a value of which continuously drops with respect to time; defining an occurrence pattern of successive two or more pieces of protruding data in the time-series data; and detecting two or more pieces of protruding data matching the occurrence pattern defined from among a set of pieces of protruding data extracted.

Advantageous Effects of Invention

According to this invention, two or more pieces of protruding data matching an occurrence pattern defined by the occurrence pattern defining unit is detected, from a set of pieces of protruding data, and thus even when there is no event information, time-series data of an event section can be extracted by using the occurrence pattern defining features of an intrinsic waveform pattern of the time-series data.

DESCRIPTION OF EMBODIMENTS

To describe the invention further in detail, embodiments for carrying out the invention will be described below with respect to the accompanying drawings.

First Embodiment

Figure 1:
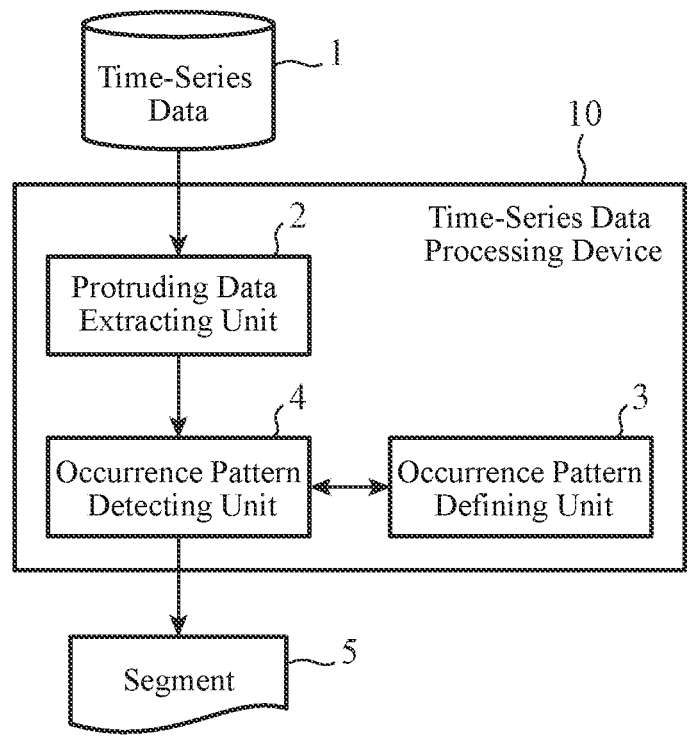
FIG. 1 is a block diagram illustrating an exemplary configuration of a time-series data processing device according to a first embodiment of the present invention.

FIG. 1 is a block diagram illustrating an exemplary configuration of a time-series data processing device 10 according to a first embodiment of the present invention.

The time-series data processing device 10 includes a protruding data extracting unit 2, an occurrence pattern defining unit 3, and an occurrence pattern detecting unit 4.

Time-series data 1 is a sequence of values obtained from sequential observation with the elapse of time. The time-series data 1 may be any data and is for example time-series data accumulated in a control system for controlling processes in a power generation plant such as thermal power generation, hydraulic power generation, or nuclear power generation, a chemical plant, an iron and steel plant, a water and sewerage plant, or the like. Alternatively, the time-series data 1 may be time-series data accumulated in a control system for controlling, for example, air conditioning, electricity, lighting, or water supply and drainage in a building, a factory, etc. Further alternatively, the time-series data 1 may be time-series data accumulated in an information system related to economics, management, or the like.

The time-series data 1 is input to the protruding data extracting unit 2 of the time-series data processing device 10.

The protruding data extracting unit 2 extracts, from the time-series data 1, protruding data including an ascending leg a value of which continuously rises with respect to time and a descending leg a value of which continuously drops with respect to time, and inputs the protruding data to the occurrence pattern detecting unit 4.

The occurrence pattern defining unit 3 defines an occurrence pattern of the protruding data in the time-series data 1. That is, the occurrence pattern defining unit 3 stores definition data of the occurrence pattern. As the occurrence pattern, at least one of an amplitude of the protruding data, a support of the protruding data, and an interval between pieces of protruding data is defined.

The occurrence pattern detecting unit 4 detects one or more pieces of protruding data matching the occurrence pattern defined by the occurrence pattern defining unit 3 from among a set of pieces of protruding data extracted by the protruding data extracting unit 2. Hereinafter, one or more pieces of protruding data matching the occurrence pattern are referred to as a segment 5.

Figure 2:
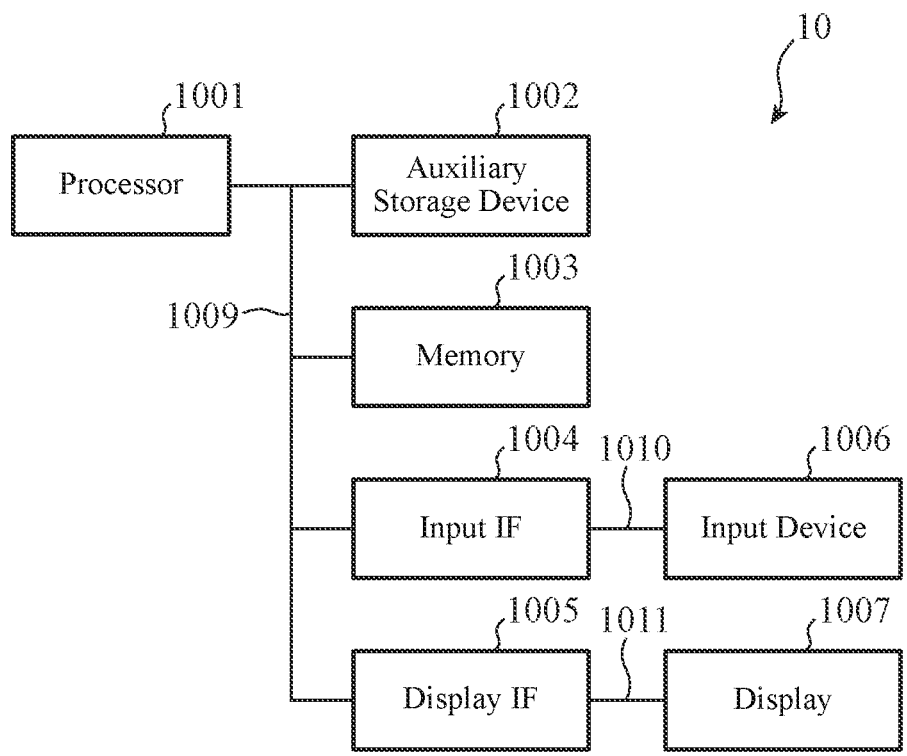
FIG. 2 is a hardware configuration diagram illustrating an exemplary hardware configuration of the time-series data processing device according to the first embodiment.

FIG. 2 is a hardware configuration diagram illustrating an exemplary hardware configuration of the time-series data processing device 10. The time-series data processing device 10 is a computer including hardware such as a processor 1001, an auxiliary storage device 1002, a memory 1003, an input interface (hereinafter referred to as IF) 1004, and a display IF 1005. The processor 1001 is connected to other hardware via a signal line 1009. The input IF 1004 is connected to an input device 1006 via a cable 1010. The display IF 1005 is connected to a display 1007 via a cable 1011.

The functions of the protruding data extracting unit 2 and the occurrence pattern detecting unit 4 in the time-series data processing device 10 are implemented by software, firmware, or a combination of software and firmware. The software or firmware is described as a program and stored in the auxiliary storage device 1002. This program causes the computer to execute the procedure or method of the protruding data extracting unit 2 and occurrence pattern detecting unit 4.

Likewise, input data such as the time-series data 1 and the definition data of the occurrence pattern is also stored in the auxiliary storage device 1002. Moreover, output data such as the segment 5 detected by the occurrence pattern detecting unit 4 may also be output to and stored in the auxiliary storage device 1002.

The program and the input data such as the time-series data 1 and the definition data of the occurrence pattern stored in the auxiliary storage device 1002 are loaded to the memory 1003 and read by the processor 1001, which results in execution of the functions of the protruding data extracting unit 2 and occurrence pattern detecting unit 4. The execution result is written in the memory 1003 and stored in the auxiliary storage device 1002 as output data or is output to an output device such as the display 1007 via the display IF 1005.

The input device 1006 is used for input of the time-series data 1 and the definition data of the occurrence pattern as well as for input of start request of time-series data processing which will be described later. The input data received by the input device 1006 is stored in the auxiliary storage device 1002 via the input IF 1004. The start request accepted by the input device 1006 is input to the processor 1001 via the input IF 1004.

Next, the time-series data 1 will be described.

Time-series data is a list of order of real-number values and is denoted as $x = \{x(1), x(2), \ldots, x(N-1), x(N)\}$. Letter x represents the name of a data item. Value $x(i)$ represents a value at a time point i of the data item x. Letter i represents an integer satisfying $1 \leq i \leq N$, where N is referred to as the length of the time-series data x and is denoted as length (x).

Figure 3A:
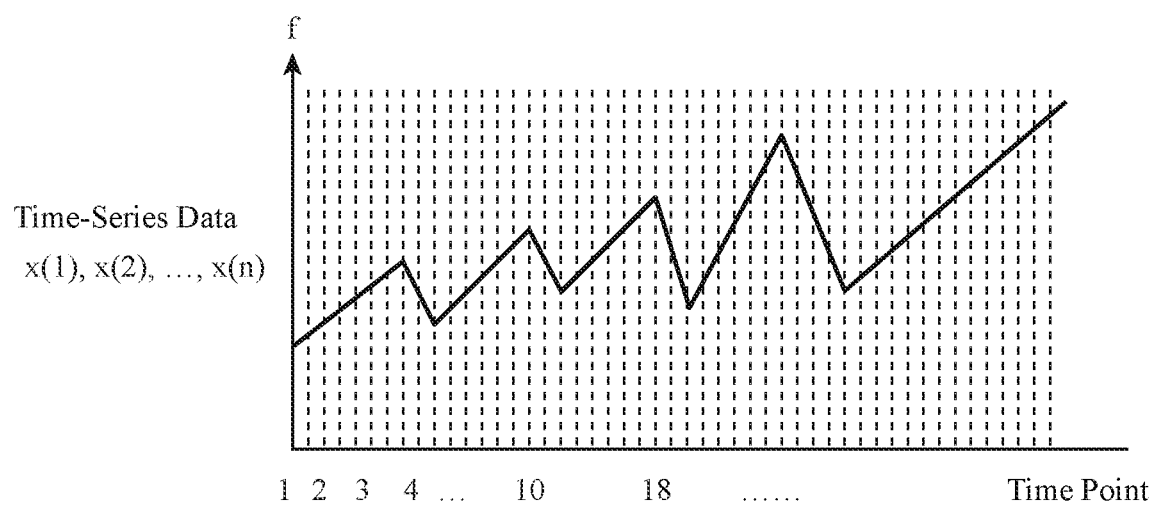
FIG. 3A is a graph visualizing time-series data in the first embodiment.

FIG. 3A is a diagram visualizing time-series data with a vertical axis representing values of time-series data and a horizontal axis representing time points.

A subsequence $x[i:j]$ of the time-series data x is a continuous subsequence $\{x(i), x(i+1), \ldots, x(j)\}$ in the time-series data. Here, i and j are integers satisfying $1 \leq i \leq j \leq$ length (x). The length of the subsequence is denoted as $j-i+1$. This length of the subsequence is referred to as a window size.

Figure 3B:
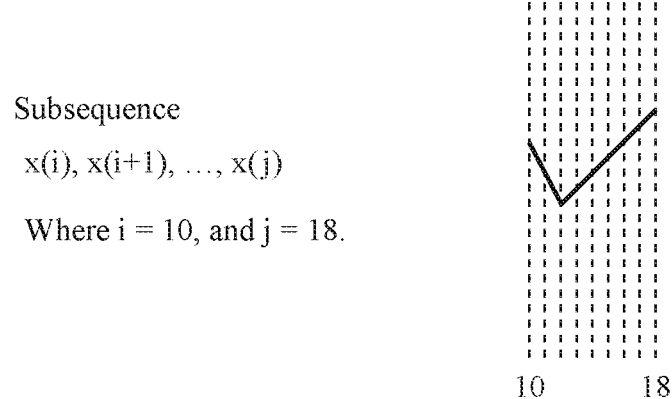
FIG. 3B is a graph visualizing a subsequence out of the time-series data of FIG. 3A.

FIG. 3B is a graph visualizing a subsequence obtained where $i=10$ and $j=18$ in the time-series data of FIG. 3A.

Next, a leg is formally defined.

Figure 4A:
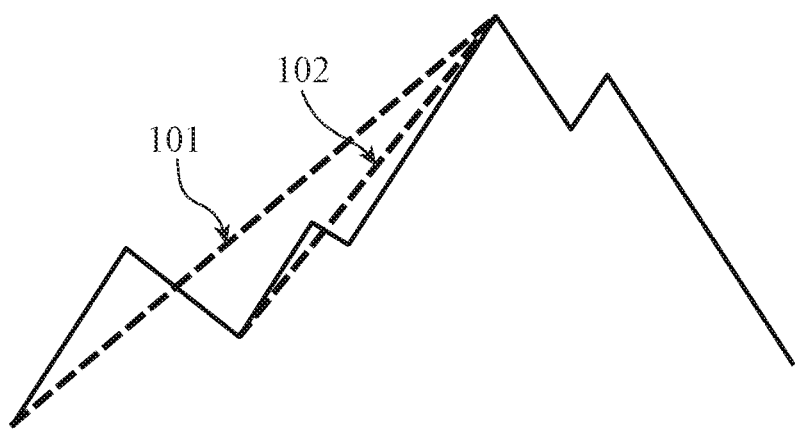
FIG. 4A is a graph illustrating exemplary legs in time-series data in the first embodiment.
Figure 4B:
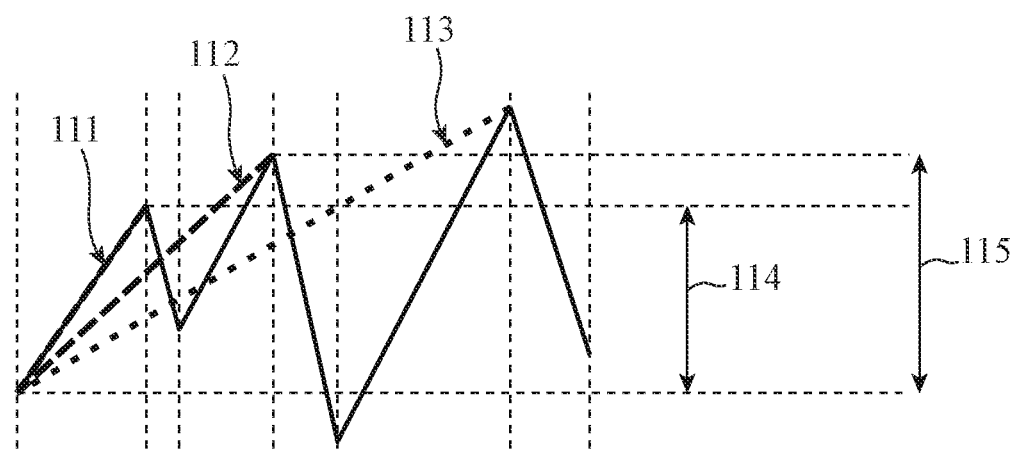
FIG. 4B is a graph illustrating an example that is not a leg.

FIG. 4A is a graph illustrating exemplary legs in the time-series data 1. FIG. 4B is a graph illustrating exemplary legs and an example which is not a leg. A leg is a subsequence that may locally include minor vertical fluctuations but rises or drops overall.

(1) Monotonous Leg

For all values i satisfying $p<i<q$, a subsequence $x[p:q]$ that satisfies either $x(p) \leq x(i) \leq x(i+1) \leq x(q)$ or $x(p) \geq x(i) \geq x(i+1) \geq x(q)$ is referred to as a monotonous leg.

A case where $x(p) \leq x(i) \leq x(i+1) \leq x(q)$ is satisfied is referred to as an ascending monotonous leg, and a case where $x(p) \geq x(i) \geq x(i+1) \geq x(q)$ satisfied is referred to as a descending monotonous leg.

A subsequence 111 in FIG. 4B is an ascending monotonous leg.

(2) Leg

For all values i satisfying $p \leq i \leq q$, a subsequence $x[p:q]$ that satisfies either $x(p) \leq x(i) \leq x(q)$ or $x(p) \geq x(i) \geq x(q)$ is referred to as a leg.

That is, like subsequences 101 and 102 in FIG. 4A, albeit not necessarily being monotonous, the case where the maximum value and the minimum value of a subsequence remain within a range between a value at a start point and a value at an end point of the subsequence is referred to as a leg.

(3) Amplitude of Leg

Where a subsequence $x[p:q]$ is a leg, $x_q - x_p$ is referred to as the amplitude of the leg denoted as amp $(x[p:q])$. Moreover, in the case where the sign of the amplitude denoted as sign (amp $(x[p:q])$) is positive, the leg is referred to as an ascending leg, and in the case of a negative sign, the leg is referred to as a descending leg.

That is, in FIG. 4B, the amplitude of the leg that is the subsequence 111 is a portion indicated by an arrow 114. The amplitude of a leg that is the subsequence 112 is a portion indicated by an arrow 115.

Next, the protruding data will be described.

Figure 5A:
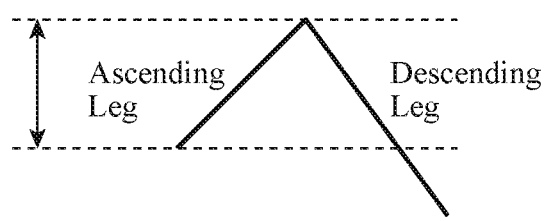
FIGS. 5A and 5B are graphs illustrating examples of protruding data in the first embodiment.
Figure 5B:
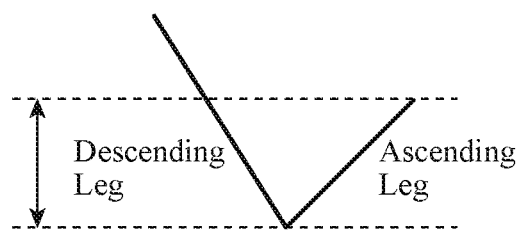

FIG. 5A is a graph illustrating an example of protruding data in which a descending leg appears after an ascending leg. FIG. 5B is a graph illustrating an example of protruding data in which an ascending leg appears after a descending leg. Here, an amplitude of protruding data is defined by a smaller one of the height of an ascending leg and the height of a descending leg.

In order to distinguish the order in which an ascending leg and a descending leg appear, signs of protruding data are defined. As illustrated in FIG. 5A, the sign of the protruding data in which the descending leg appears after the ascending leg is positive. That is, the protruding data in FIG. 5A has the number of vibrations of 2 and an amplitude of A. On the other hand, as illustrated in FIG. 5B, the sign of the protruding data in which the ascending leg appears after the descending leg is negative. That is, the protruding data in FIG. 5B has the number of vibrations of −2 and an amplitude of A.

As for a procedure for extracting the protruding data, a procedure described in International Publication No. 2015/173860 or the following Non-Patent Literature 1 may be used. The protruding data extracting unit 2, which will be described later, extracts a vibration path with the number of vibrations of 2 or −2 in accordance with a procedure described in one of the literatures.

Non-Patent Literature 1

Makoto Imamura, Takaaki Nakamura, Hideya Shibata, Norio Hirai, Shinji Kitagami, Tatsuji Munaka, "Leg Vibration Analysis for Time Series," Information Processing Society of Japan (IPSJ) Journal vol. 57, No. 4, pp. 1303-1318 (2016).

Next, the segment 5 will be described.

Figure 6A:
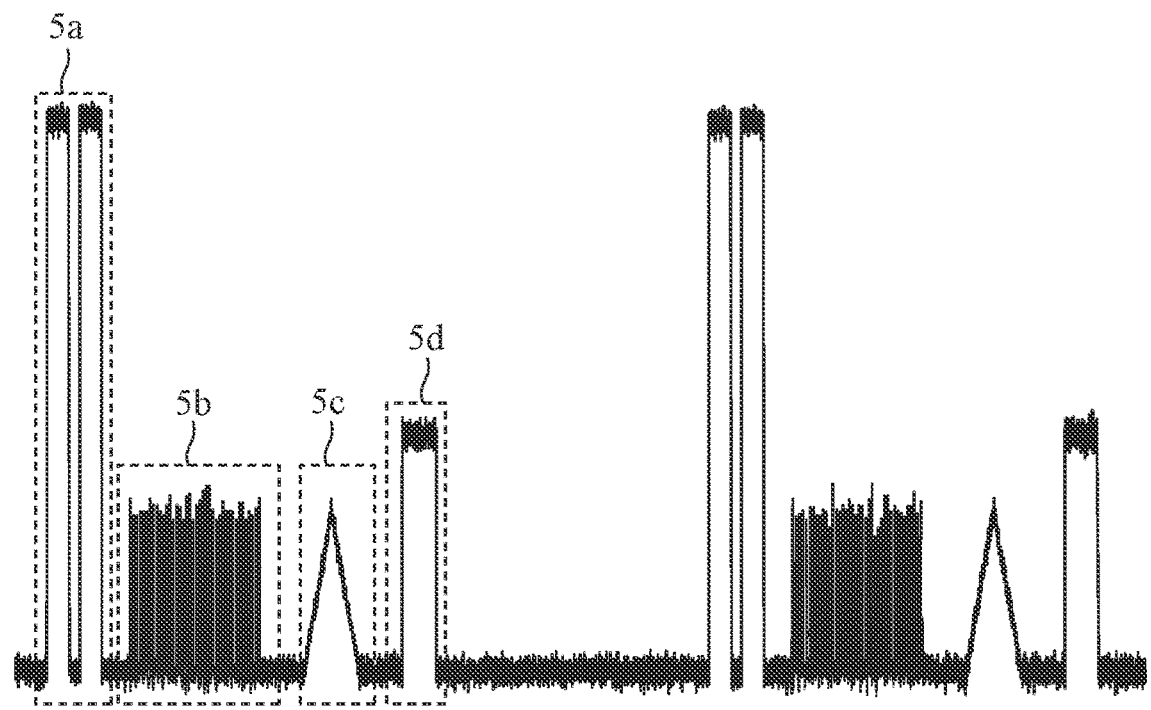
FIGS. 6A and 6B are graphs illustrating exemplary segments in the first embodiment.

FIG. 6A is a graph illustrating exemplary segments in time-series data observed by a sensor of a certain manufacturing apparatus. Due to switching of operation patterns of the manufacturing apparatus, the time-series data includes characteristic patterns such as segments 5a, 5b, 5c, and 5d. The data analysis device according to Patent Literature 1 described above cannot extract the segments 5a, 5b, 5c, and 5d unless event information indicating switching timings of the operation patterns of the manufacturing apparatus is provided. On the other hand, the time-series data processing device 10 according to the first embodiment is configured to extract the segments 5a, 5b, 5c, and 5d even when there is no event information.

Figure 6B:
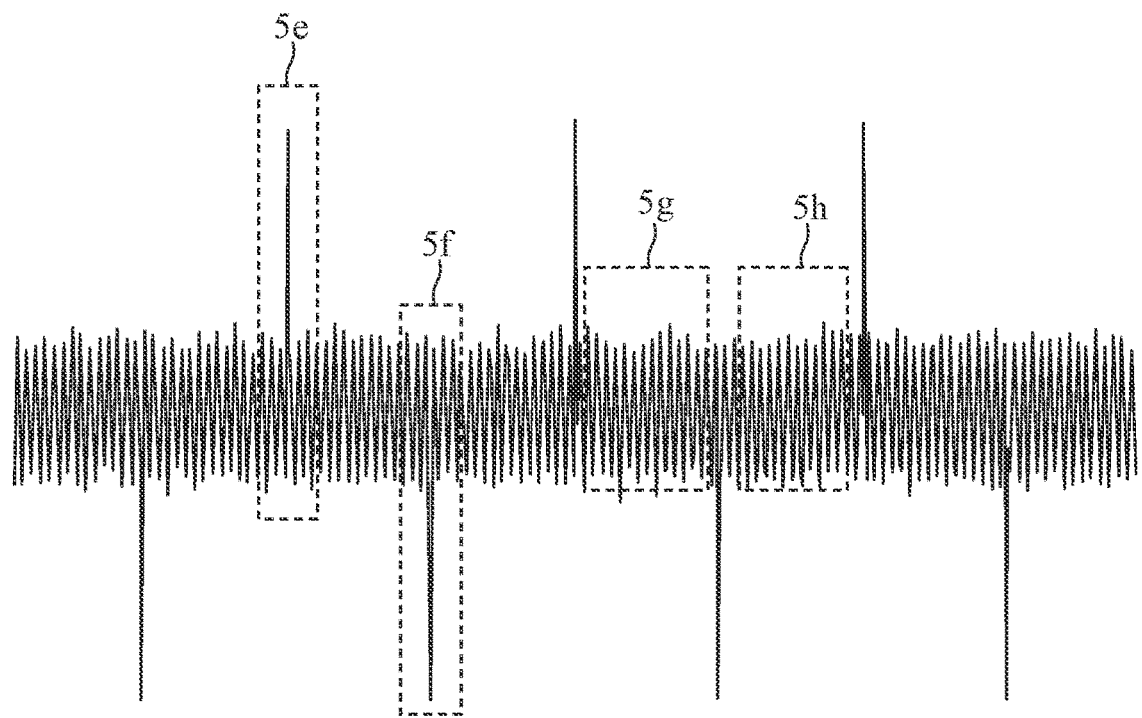

FIG. 6B is a graph illustrating exemplary segments in time-series data observed by a sensor of a certain manufacturing apparatus. The segment 5 may be protruding data representing large and sudden fluctuation in a short time like segments 5e and 5f. Alternatively, the segment 5 may be a pattern in which vibrations having a certain amplitude are successive, such as a pattern excluding protruding data portions indicating sudden fluctuations, like segments 5g and 5h.

Next, the operation of the time-series data processing device 10 will be described.

Figure 7:
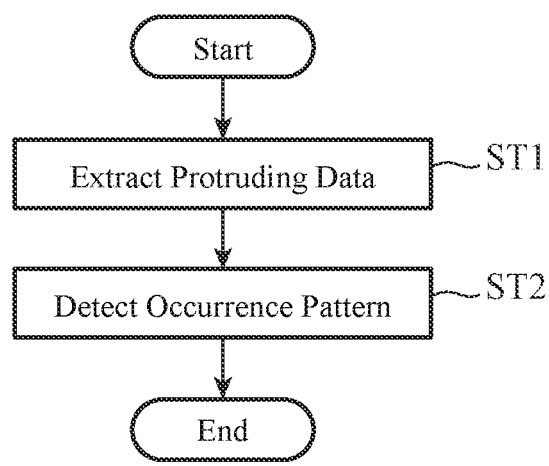
FIG. 7 is a flowchart illustrating the operation of the time-series data processing device according to the first embodiment.

FIG. 7 is a flowchart illustrating the operation of the time-series data processing device 10. The operation of the time-series data processing device 10 will be described with reference to FIGS. 8A, 8B, and 8C.

The time-series data processing device 10 starts the operation illustrated in FIG. 7 in accordance with a start request for time-series data processing accepted by the input device 1006. Note that it is assumed that the time-series data 1 and the definition data of the occurrence pattern are stored in the auxiliary storage device 1002 before start of the operation illustrated in FIG. 7.

In step ST1, the protruding data extracting unit 2 extracts, from the time-series data 1, protruding data in which a descending leg appears after an ascending leg or protruding data in which an ascending leg appears after a descending leg.

Figure 8A:
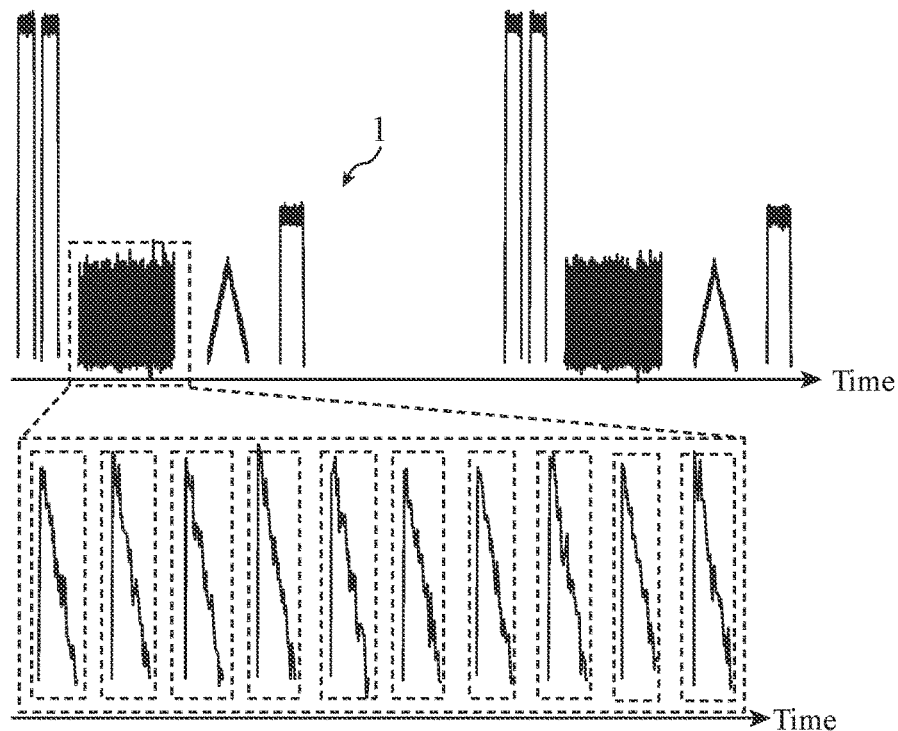
FIGS. 8A, 8B, and 8C are graphs illustrating the operation of the time-series data processing device according to the first embodiment.
Figure 8B:
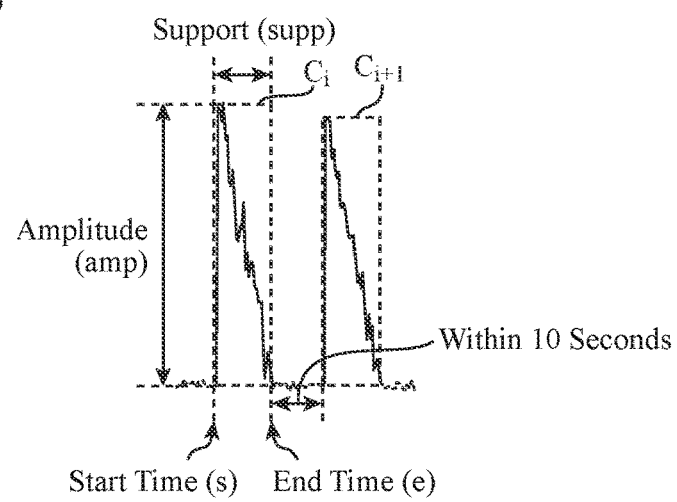

In FIG. 8A, a set of pieces of protruding data extracted from the time-series data 1 by the protruding data extracting unit 2 is illustrated. In FIG. 8B protruding data extracted by the protruding data extracting unit 2 is illustrated in an enlarged manner. The height of protruding data is referred to as an amplitude. The width of the protruding data, that is, a period from start time to end time is referred to as the length of a support. Moreover, a period from end time of protruding data appearing earlier to start time of protruding data appearing subsequently is referred to as an interval between the pieces of protruding data.

The occurrence pattern defined by the occurrence pattern defining unit 3 is, for example, the following inequalities (1).

According to the occurrence pattern of the inequalities (1), it is defined that "a subsequence in which protruding data, having an amplitude of greater than or equal to 1 and less than or equal to 1.2 and a support of less than or equal to 15 seconds, appears successively within 10 seconds is regarded as a segment."

$$\{C_i | 1.0 \leq \text{amp}(C_i) \leq 1.2, \text{ and } \text{supp } (C_i) \leq 15, \text{ and } (s(C_{i+1}) - e(C_i)) \leq 10\} \quad (1)$$

Where $C_i$ denotes i-th protruding data, s $(C_i)$ denotes start time of the protruding data i, and e $(C_i)$ denotes end time of the protruding data i. Further, amp $(C_i)$ denotes the amplitude of the protruding data i, and supp $(C_i)$ denotes a support of the protruding data i.

In step ST2, the occurrence pattern detecting unit 4 collates the set of pieces of protruding data extracted by the protruding data extracting unit 2 and the occurrence pattern defined by the occurrence pattern defining unit 3. As a method of collation, in a naive manner, there is a method of searching protruding data in time series and examining whether the protruding data conforms to the occurrence pattern. Then, the occurrence pattern detecting unit 4 detects one or more pieces of protruding data matching the occurrence pattern defined by the occurrence pattern defining unit 3 and outputs the protruding data as the segment 5.

Figure 8C:
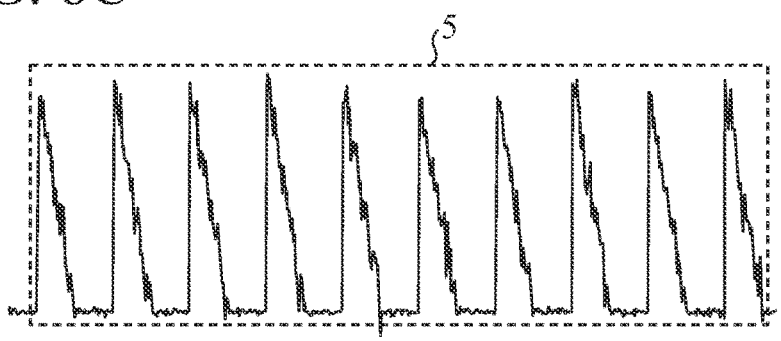

In FIG. 8C an example of the segment 5 detected by the occurrence pattern detecting unit 4 is illustrated. As illustrated in FIG. 8C, one or more pieces of protruding data matching the occurrence pattern defined by the inequalities (1) are detected as the segment 5.

Conditions that can be specified as an occurrence pattern may include, other than the amplitude, the length of a support, or a time difference between preceding and subsequent protruding data as described above, a condition of the number of times or a time length of successive protruding data, or an exception condition as to how many times of appearances of protruding data not conforming to a condition can be accepted in successive protruding data. For example, in the case where a set C of k pieces of protruding data is obtained under the definition of the inequalities (1) and the condition for the number of elements of C is defined as in the following inequality (2), the occurrence pattern detecting unit 4 detects C as the segment 5 if the number of elements of C is greater than or equal to 20.

$$\text{count}(C) \geq 20 \quad (2)$$

Alternatively, when the condition for a period of the segment is defined as in the following inequality (3), the occurrence pattern detecting unit 4 detects, as the segment 5, the set C of k pieces of protruding data if a time length from protruding data $C_i$ at the head to protruding data $C_k$ at the end is longer than or equal to 100.

$$(e(C_k)-s(C_1) \geq 100 \tag{3}$$

Furthermore, in the case where the number of times of exception is defined as except≤2, the occurrence pattern detecting unit 4 increments an internal counter every time protruding data not matching the occurrence pattern is detected during the search based on the definition of the inequalities (1), and when the number of three times is reached, detects, as the segment 5, the set C of pieces of protruding data having been obtained by that time.

Note that although the example in which the segment 5b illustrated in FIG. 6A is detected using the definition data of the inequalities (1) has been described in FIGS. 8A, 8B, and 8C, it goes without saying that it is also possible to detect the segments 5a, 5c and 5d of FIG. 6A by using other definition data.

As described above, the time-series data processing device 10 according to the first embodiment includes: the protruding data extracting unit 2 for extracting, from the time-series data 1 which is a sequence of values obtained from sequential observation with elapse of time, protruding data including an ascending leg a value of which continuously rises with respect to time and a descending leg a value of which continuously drops with respect to time; the occurrence pattern defining unit 3 for defining an occurrence pattern of protruding data in the time-series data 1; and the occurrence pattern detecting unit 4 for detecting one or more pieces of protruding data matching the occurrence pattern defined by the occurrence pattern defining unit 3, from among a set of pieces of protruding data extracted by the protruding data extracting unit 2. By expressing features of an intrinsic waveform pattern of the time-series data 1 as an occurrence pattern of protruding data, time-series data of an event section can be extracted as the segment 5 even when there is no event information.

Second Embodiment

Figure 9:
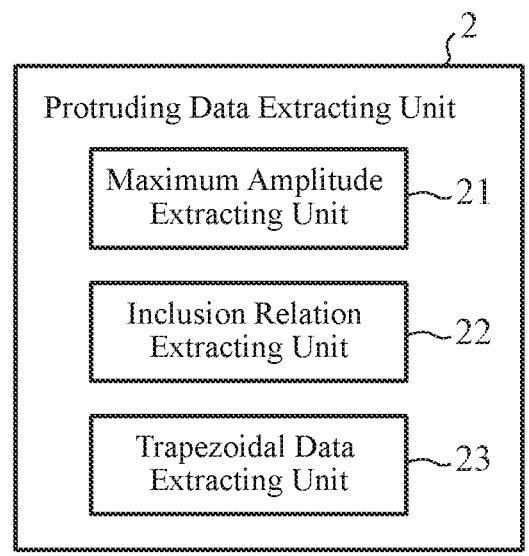
FIG. 9 is a block diagram illustrating an internal configuration example of a protruding data extracting unit of a time-series data processing device according to a second embodiment of the present invention.

FIG. 9 is a block diagram illustrating an internal configuration example of the protruding data extracting unit 2 of the time-series data processing device 10 according to the first embodiment of the present invention. Since the overall configuration of a time-series data processing device 10 according to a second embodiment is the same as that of the time-series data processing device 10 according to the first embodiment illustrated in FIG. 1, FIG. 1 is referred to in the following description.

As illustrated in FIG. 9, a protruding data extracting unit 2 of the time-series data processing device 10 according to the second embodiment includes a maximum amplitude extracting unit 21, an inclusion relation extracting unit 22, and a trapezoidal data extracting unit 23. Note that the protruding data extracting unit 2 may include at least one of the maximum amplitude extracting unit 21, the inclusion relation extracting unit 22, and the trapezoidal data extracting unit 23.

The maximum amplitude extracting unit 21 extracts protruding data having the maximum amplitude, the protruding data including a time point at which the value of the time-series data 1 reaches an extreme value.

Figure 10A:
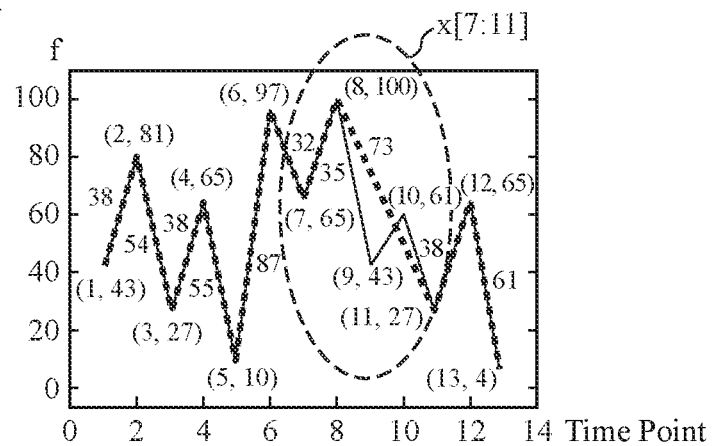
FIGS. 10A, 10B, and 10C are graphs for explaining the operation of a maximum amplitude extracting unit according to the second embodiment.
Figure 10B:
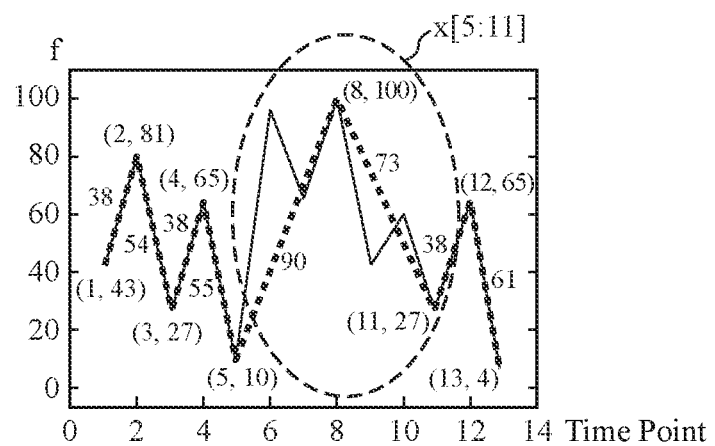
Figure 10C:
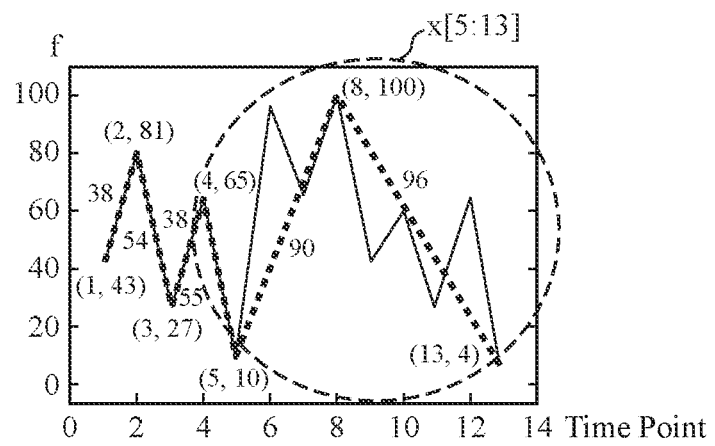

FIGS. 10A, 10B, and 10C are diagrams for explaining the operation of the maximum amplitude extracting unit 21. Although time-series data 1 illustrated in FIGS. 10A, 10B, and 10C are the same, in the case where the same maximum point (here, time point 8) is taken as a reference, there are pieces of protruding data having various amplitudes. The protruding data in FIG. 10A is a subsequence x [7:11] having a height of 35 on the left side of the time point 8 and a height of 73 on the right side of the time point 8. When the amplitude of protruding data is defined by a smaller height of the left and right heights, the protruding data of FIG. 10A has an amplitude of 35.

The protruding data in FIG. 10B is a subsequence x [5:11] having a height of 90 on the left side of the time point 8, a height of 73 on the right side of the time point 8, and an amplitude of 73.

The protruding data in FIG. 10C is a subsequence x [5:13] having a height of 90 on the left side of the time point 8, a height of 96 on the right side, and an amplitude of 90.

In this manner, there is a case where the range of protruding data extending to the left and right from the same extreme value point is not uniquely determined, and thus where there are a plurality of ranges. In such a case, the maximum amplitude extracting unit 21 extracts the protruding data of FIG. 10C having the maximum amplitude from among the three pieces of protruding data in FIGS. 10A, 10B, and 10C at the time point 8 at which the value of the time-series data 1 reaches the extreme value, and inputs the extracted protruding data to the occurrence pattern detecting unit 4. The maximum amplitude extracting unit 21 does not extract the protruding data of FIG. 10A nor the protruding data of FIG. 10B.

In the case where two or more pieces of protruding data are mutually in inclusion relation, the inclusion relation extracting unit 22 distinguishes the two or more pieces of protruding data as being either vibration data or non-vibration data and extracts only protruding data that has been distinguished as being non-vibration data.

Figure 11A:
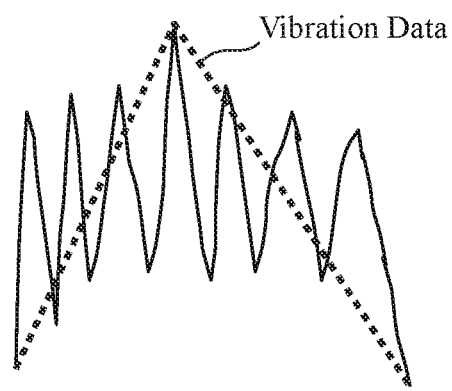
FIGS. 11A, 11B, and 11C are graphs for explaining the operation of an inclusion relation extracting unit according to the second embodiment.
Figure 11B:
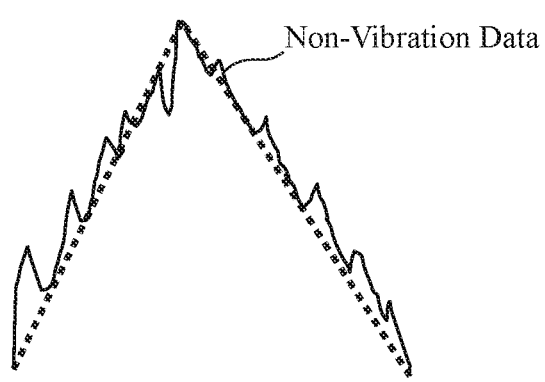
Figure 11C:
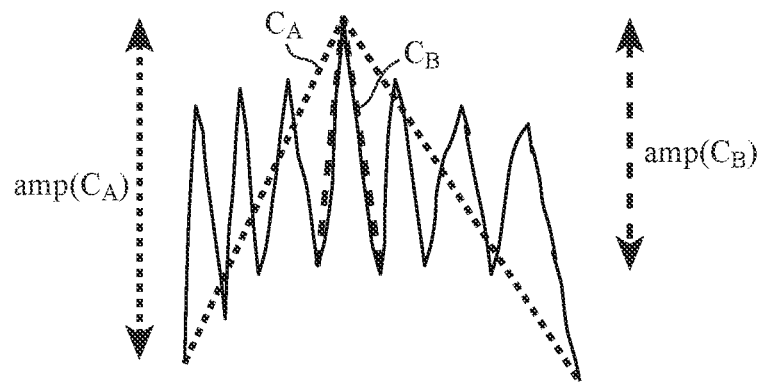

FIGS. 11A, FIG. 11B, and FIG. 11C are diagrams for explaining the operation of the inclusion relation extracting unit 22. As defined in the item (2) of the first embodiment, a leg is a subsequence x[p:q] that satisfies $x(p) \leq x(i) < x(q)$ or $x(p) \geq x(i) \geq x(q)$ for all values i satisfying $p \leq i \leq q$. Therefore, the protruding data extracting unit 2 of the first embodiment may extract a vibrating subsequence as protruding data. FIG. 11A is an example of protruding data appearing to be vibration, which is distinguished as being vibration data in the inclusion relation extracting unit 22. FIG. 11B is an example of protruding data that appears to have a protruding shape including vibrations, which is distinguished as being non-vibration data in the inclusion relation extracting unit 22.

In FIG. 11C, protruding data $C_A$ and $C_B$ which are mutually in inclusion relation are illustrated. In the case where the large protruding data $C_A$ includes the small protruding data $C_B$, the inclusion relation extracting unit 22 distinguishes the large protruding data $C_A$ as being either vibration data or non-vibration data by using an inequality (4). When the inequality (4) is true, the inclusion relation extracting unit 22 distinguishes the large protruding data $C_A$ as being non-vibration data, extracts this protruding data $C_A$, and inputs the protruding data $C_A$ to the occurrence pattern detecting unit 4. On the other hand, when the inequality (4) is not true, the inclusion relation extracting unit 22 distinguishes the large protruding data $C_A$ as being vibration data and does not extract the protruding data $C_A$.

$$\mathrm{amp}(C_B)/\mathrm{amp}(C_A) < \alpha \tag{4}$$

Where amp ($C_A$) denotes the amplitude of the protruding data $C_A$, and amp ($C_B$) is the amplitude of the protruding data $C_B$. Letter α denotes a value preset for the inclusion relation extracting unit 22.

The trapezoidal data extracting unit 23 extracts trapezoidal protruding data.

Figure 12A:
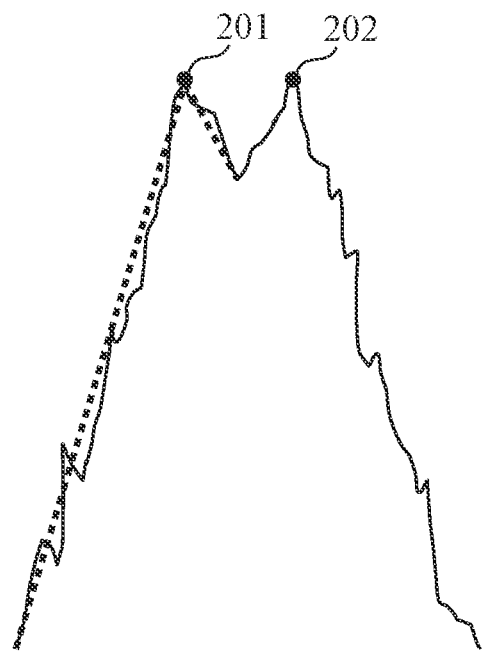
FIGS. 12A and 12B are graphs for explaining the operation of a trapezoidal data extracting unit according to the second embodiment.
Figure 12B:
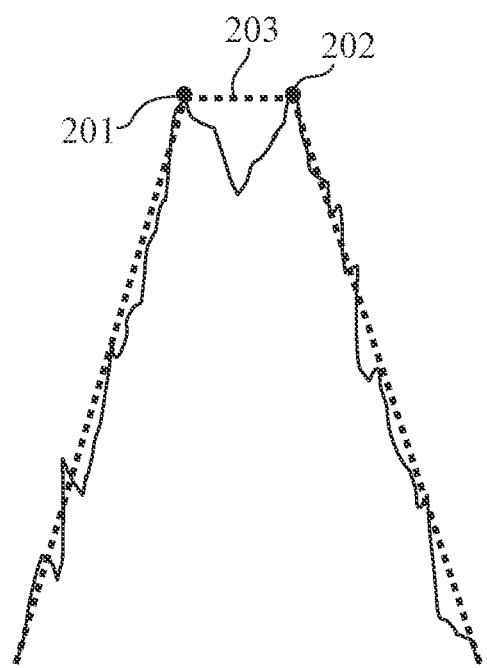

FIGS. 12A and 12B are diagrams for explaining the operation of the trapezoidal data extracting unit 23. The protruding data extracting unit 2 of the first embodiment extracts triangular protruding data which includes an ascending leg and a descending leg. Therefore, in the case of a subsequence having a protruding shape in which there is a plurality of maximum points 201 and 202 of the same value as illustrated in FIG. 12A, the protruding data extracting unit 2 cannot extract, as protruding data, the entire subsequence having a protruding shape in its entirety, but extracts, as protruding data, a triangular subsequence locally having a protruding shape as indicated by a broken line.

Therefore, as illustrated in FIG. 12B, in the subsequence having the protruding shape in which there is the plurality of maximum points 201 and 202 of the same value, the trapezoidal data extracting unit 23 introduces an extension leg 203 that extends the maximum point 201 appearing first to the right. As long as the maximum period corresponding to the length of an upper side of the trapezoid is not exceeded, the trapezoidal data extracting unit 23 extends the extension leg 203 to the right, and thereby extracts the protruding data having the trapezoidal shape as indicated by the broken line. Note that it is assumed that the maximum period corresponding to the length of an upper side of a trapezoid is preset for the trapezoidal data extracting unit 23. Moreover, the maximum points 201 and 202 included in the extension leg 203 are not limited to strictly the same value but may be substantially the same values, like by allowing, with respect to a preset ratio β, deviations within ±β% of the value of the maximum point 201.

Note that although in FIGS. 10 to 12 upwardly protruding subsequences have been described as examples, it goes without saying that a downwardly protruding subsequence can be handled similarly.

As described above, the protruding data extracting unit 2 of the second embodiment includes the maximum amplitude extracting unit 21 that extracts protruding data having the maximum amplitude, the protruding data including a time point at which a value of time-series data reaches an extreme value. With this configuration, robust extraction of protruding data can be implemented.

Moreover, the protruding data extracting unit 2 of the second embodiment includes the inclusion relation extracting unit 22 that, in the case where two or more pieces of protruding data are mutually in inclusion relation, distinguishes the two or more pieces of protruding data as being either vibration data or non-vibration data and extracts only protruding data that has been distinguished as being non-vibration data. With this configuration, robust extraction of protruding data can be implemented.

Furthermore, the protruding data extracting unit 2 of the second embodiment includes the trapezoidal data extracting unit 23 that extracts trapezoidal-shaped data as protruding data. With this configuration, robust extraction of protruding data can be implemented.

Note that, within the scope of the present invention, the present invention may include a flexible combination of the embodiments, a modification of any component of the embodiments, or omission of any component in the embodiments.

INDUSTRIAL APPLICABILITY

A time-series data processing device according to the present invention detects time-series data that matches a certain occurrence pattern and thus is suitable for use in a time-series data processing device for detecting fluctuations in sensor values of a control system of a plant, a building, a factory, or the like or fluctuations in data such as stock prices or sales.

REFERENCE SIGNS LIST

1 Time-series data
2 Protruding data extracting unit
3 Occurrence pattern defining unit
4 Occurrence pattern detecting unit
5 Segment
10 Time-series data processing device
21 Maximum amplitude extracting unit
22 Inclusion relation extracting unit
23 Trapezoidal data extracting unit
1001 Processor
1002 Auxiliary storage device
1003 Memory
1004 Input IF
1005 Display IF
1006 Input device
1007 Display
1009 Signal line
1010, 1011 Cable.

The invention claimed is:

1. A time-series data processing device of a system that generates data including fluctuations, the time-series data processing device including a protruding data extractor, an occurrence pattern detector, and an occurrence pattern determiner, the time-series data processing device, comprising:
   a processor to execute a program; and
   a memory to store the program which, when executed by the processor, performs processes of,
   extracting, by the protruding data extractor, from time-series data which is a sequence of values obtained from sequential observation with elapse of time, protruding data including an ascending leg a value of which continuously rises with respect to time and a descending leg a value of which continuously drops with respect to time, and in which the descending leg appears after the ascending leg or an ascending leg appears after the descending leg;
   defining, by the occurrence pattern detector, an occurrence pattern of successive two or more pieces of protruding data in the time-series data;
   detecting, by the occurrence pattern determiner, two or more pieces of protruding data matching the occurrence pattern defined, from among a set of pieces of protruding data extracted; and
   determining an abnormality of the system when the two or more pieces of protruding data matches the occurrence pattern defined.

2. The time-series data processing device according to claim 1, wherein at least one of: an interval between successive pieces of protruding data, the number of times or a time length protruding data appears successively, and the number of appearances of protruding data not conforming to a condition is defined as the occurrence pattern.

3. The time-series data processing device according to claim 1, wherein the processor extracts protruding data having a maximum amplitude, the protruding data including a time point at which a value of the time-series data reaches an extreme value.

4. The time-series data processing device according to claim 1, wherein the processor, when two or more pieces of protruding data are mutually in inclusion relation, distinguishes the two or more pieces of protruding data as being either vibration data or non-vibration data, and extracts only protruding data that has been distinguished as being the non-vibration data.

5. The time-series data processing device according to claim 1, wherein the processor extracts, when successively-appearing two or more pieces of protruding data each have a same maximum point, the two or more protruding data as one piece of data having a trapezoidal shape.

* * * * *